US012760400B2

(12) United States Patent
Strock

(10) Patent No.: US 12,760,400 B2
(45) **Date of Patent: *Oct. 13, 2026**

(54) METHOD OF MANUFACTURING FIBER REINFORCED BARRIER COATING

(71) Applicant: RTX CORPORATION, Farmington, CT (US)

(72) Inventor: Christopher W. Strock, Kennebunk, ME (US)

(73) Assignee: RTX CORPORATION, Farmington, CT (US)

( * ) Notice: Subject to any disclaimer, the term of this patent is extended or adjusted under 35 U.S.C. 154(b) by 618 days.

This patent is subject to a terminal disclaimer.

(21) Appl. No.: 17/471,832

(22) Filed: Sep. 10, 2021

(65) Prior Publication Data

US 2021/0404045 A1 Dec. 30, 2021

Related U.S. Application Data

(63) Continuation of application No. 15/033,153, filed as application No. PCT/US2014/062387 on Oct. 27, 2014, now Pat. No. 11,118,257.

(Continued)

(51) Int. Cl.

*C23C 4/134* (2016.01)
*C23C 4/02* (2006.01)

(Continued)

(52) U.S. Cl.

CPC ................ *C23C 4/134* (2016.01); *C23C 4/02* (2013.01); *C23C 4/04* (2013.01); *C23C 4/10* (2013.01); *C23C 4/18* (2013.01); *F01D 5/288* (2013.01); *F23R 3/002* (2013.01); *F05D 2230/312* (2013.01); *F05D 2300/6033* (2013.01); *F23M 2900/05004* (2013.01); *F23R 2900/00018* (2013.01)

(58) Field of Classification Search

CPC .... C23C 4/02; C23C 4/04; C23C 4/10; C23C 4/11; C23C 4/134; C23C 4/18; F01D 5/288; F05D 2230/312; F05D 2300/6033; F23M 2900/05004; F23R 2900/00018; F23R 3/002

See application file for complete search history.

(56) References Cited

U.S. PATENT DOCUMENTS 4,595,637 A 6/1986 Eaton et al.
5,024,859 A 6/1991 Millard (Continued)

FOREIGN PATENT DOCUMENTS

CN 103011818 * 4/2012
JP 59153877 9/1984

OTHER PUBLICATIONS

International Search Report and Written Opinion for PCT Application No. PCT/US2014/062387, mailed Feb. 16, 2015.

(Continued)

*Primary Examiner* — Katherine A Bareford

(74) *Attorney, Agent, or Firm* — Carlson, Gaskey & Olds, P.C.

(57) ABSTRACT

A method of manufacturing a fiber reinforced coating. The method includes providing a substrate and plasma spraying a ceramic matrix having fibers encapsulated in a precursor material onto the substrate.

20 Claims, 1 Drawing Sheet

Related U.S. Application Data

(60) Provisional application No. 61/904,838, filed on Nov. 15, 2013.

(51) Int. Cl.

| | |
|---|---|
| ***C23C 4/04*** | (2006.01) |
| ***C23C 4/10*** | (2016.01) |
| ***C23C 4/18*** | (2006.01) |
| ***F01D 5/28*** | (2006.01) |
| ***F23R 3/00*** | (2006.01) |

(56) References Cited

U.S. PATENT DOCUMENTS

| | | | | |
|---|---|---|---|---|
| 6,294,261 | B1 * | 9/2001 | Sangeeta | C23C 10/18 416/241 B |
| 6,497,758 | B1 * | 12/2002 | Hasz | C23C 28/345 106/286.1 |
| 7,510,777 | B2 | 3/2009 | Darolia et al. | |
| 8,231,703 | B1 | 7/2012 | Seals et al. | |
| 8,272,843 | B1 | 9/2012 | Ryznic et al. | |
| 11,118,257 | B2 * | 9/2021 | Strock | C23C 4/02 |
| 2001/0014648 | A1 | 8/2001 | Hums | |
| 2004/0029706 | A1 | 2/2004 | Barrera et al. | |
| 2006/0024513 | A1 | 2/2006 | Schlichting | |
| 2010/0015396 | A1 | 1/2010 | Johnson et al. | |
| 2011/0319252 | A1 | 12/2011 | Schmidt | |
| 2012/0258266 | A1 * | 10/2012 | Koban | C23C 4/11 428/34.1 |
| 2013/0260130 | A1 * | 10/2013 | Taxacher | C23C 28/341 106/482 |

OTHER PUBLICATIONS

Srinivasa et al . . . Aluminum composite reinforced with multiwalled carbon nanotubes from plasma spraying o fspray dried powders. Surface & Coatings Technology, Dec. 13, 2008, vol. 203 pp. 1544-1554. See abstract: p. 1545, left column: figures 1 and 3.

International Preliminary Report on Patentability for PCT Application No. PCT/US2014/062387 mailed May 26, 2016.

Berndt C.C. et al., The manufacture and microstructure of fiber-reinforced thermally sprayed coatings, Surface and Coatings Technology, Elsevier BV, Amsterdam, NL, vol. 37, No. 1, Feb. 1, 1989, pp. 89-110.

The Extended European Search Report for EP Application No. 14862096.6, dated Jun. 13, 2017.

“Pyrolysis” definition, the freedictionary.com 3 pages, accessed Oct. 17, 2018.

“Calcine” definition, the freedictionary.com 4 pages, accessed Oct. 17, 2018.

* cited by examiner

METHOD OF MANUFACTURING FIBER REINFORCED BARRIER COATING

CROSS-REFERENCE TO RELATED APPLICATIONS

This application is a continuation of U.S. application Ser. No. 15/033,153 filed Apr. 29, 2016, now U.S. Pat. No. 11,118,257, which is a U.S. National phase of PCT Application No. PCT/US2014/062387 filed Oct. 27, 2014, which claims priority to U.S. Provisional Application No. 61/904,838, which was filed on Nov. 15, 2013, and is incorporated herein by reference.

BACKGROUND

This disclosure relates to a method of applying a barrier spray coating.

Air plasma-sprayed (APS) thermal barrier coatings (TBC) or environmental barrier coating (EBC) made from yttria-stabilized zirconia (YSZ) and gadolinium zirconium oxide are typically used to reduce the temperature of cooled turbine and combustor components. Additionally, these materials may also be used as abradable seal materials on cooled turbine blade outer air seals (BOAS). In these applications, there are several degradation and failure modes.

Conventional APS coatings are formed by a buildup of molten ceramic particles that impact the substrate and form splats. The adhesion of the splats is dependent on the interface formed on impact. Typically, this splat interface bonding is weak and results in low fracture toughness of the coating. This leads to poor erosion and cyclic performance during service.

Due to the high temperature environment, surface sintering and shrinkage as well as thermal cycling and gradient related stresses cause cracking of the coating. These cracks generally begin at the free surface, propagate through the thickness, then branch and cause delamination just above a bond coat on the component substrate. Also, impingement by particles can erode the coating, particularly on blade and vane leading edges. Erosion may also be evident on regions with lower impact angles, such as blade outer air seals (BOAS). Finally, gross coating stresses and coating cracking can be induced by the stresses related to thermal cycling in the presence of molten contaminants such as calcium-magnesium alumino-silicate (CMAS).

SUMMARY

In one exemplary embodiment, a method of manufacturing a fiber reinforced coating. The method includes providing a substrate and plasma spraying a ceramic matrix having fibers encapsulated in a precursor material onto the substrate.

In a further embodiment of the above, the substrate is a metallic substrate.

In a further embodiment of any of the above, the metallic substrate is a nickel superalloy.

In a further embodiment of any of the above, the plasma spraying is air plasma spraying.

In a further embodiment of any of the above, the plasma spraying is suspension plasma spraying.

In a further embodiment of any of the above, the method includes the step of applying a bond coating onto the substrate prior to performing the plasma spraying step. The plasma spraying step includes adhering the ceramic matrix to the bond coat.

In a further embodiment of any of the above, the precursor material contains zirconium.

In a further embodiment of any of the above, the precursor material is at least one of zirconium sulfate, zirconium acetate and zirconia salts.

In a further embodiment of any of the above, the precursor material is an organic polymer.

In a further embodiment of any of the above, the precursor material is at least one of polyvinyl acetate, acrylic, an organo-metallic material and an organic binder.

In a further embodiment of any of the above, the method includes the step of plasma spraying additional ceramic matrix with fibers encapsulated in a precursor material onto a prior ceramic matrix layer.

In a further embodiment of any of the above, the method includes the step of heat treating the coating prior to the additional ceramic matrix plasma spraying step.

In a further embodiment of any of the above, the method includes the step of heat treating the coating subsequent to the additional ceramic matrix plasma spraying step.

In a further embodiment of any of the above, the plasma sprayed ceramic matrix provides a thermal barrier coating and includes the step of heat treating the thermal barrier coating to provide a ceramic matrix composite.

In a further embodiment of any of the above, the heat treating step includes pyrolyzing the precursor material.

In a further embodiment of any of the above, the heat treating step includes calcinating the precursor material.

In a further embodiment of any of the above, the heat treating step includes reducing at least a number or size of voids in the thermal barrier coating.

In a further embodiment of any of the above, the fibers have an aspect ratio of greater than 10:1.

In a further embodiment of any of the above, the fibers are ceramic.

In a further embodiment of any of the above, the fibers are carbon.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The disclosed thermal spray method increases the toughness of the thermal barrier coating. As a result, durability to thermally induced spallation and large particle erosion is improved.

Figure 1:
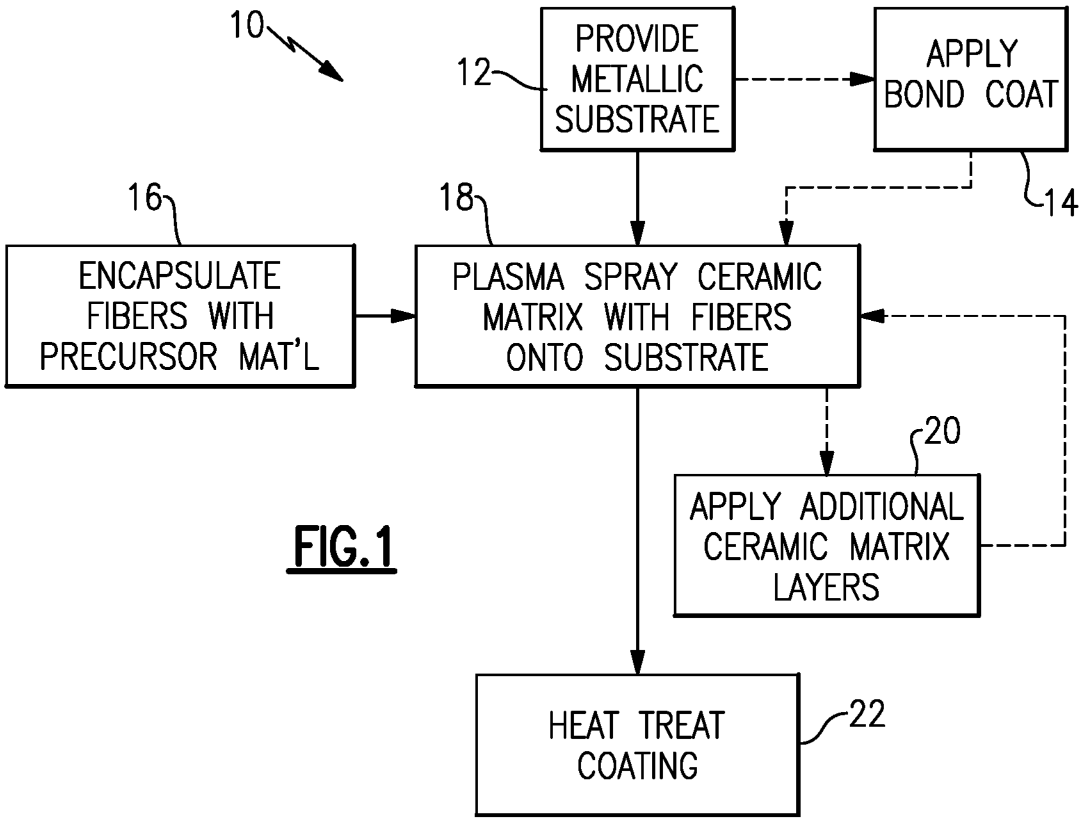
FIG. 1 is a flow chart depicting an example thermal spraying process.

A method of manufacturing a fiber reinforced coating (for example, thermal barrier coating or environmental barrier coating) is shown schematically at 10 in FIG. 1. A metallic substrate is provided, as indicated at block 12. A metallic substrate may be any suitable structure, for example, a nickel superalloy. Of course, other aerospace materials may also be used such as ceramics and ceramic matrix composites. One example of a suitable ceramic matrix composite is silicon carbide reinforced silicon carbide. A suitable bond coat may be applied to the substrate as indicated at block 14. The bond coat for a metallic component may be a MCrAlY coating where M is nickel and/or cobalt, for example, NiCoCrAlY. Alternatively or additionally, the bond coat may be an aluminide coating, a platinum aluminide coating, a ceramic-based bond coat, or a silica-based bond coat. The bond coat may be applied using any suitable technique known in the art. Example processes for applying NiCoCrAlY to a nickel super-alloy part include physical vapor deposition and thermal spray process. The bond coat may be omitted, if desired.

Fibers, which may be ceramic or carbon, for example, are encapsulated with a precursor material, as indicated at block 16. The fibers have a higher melting temperature than the precursor material. The fibers have an aspect ratio of length to width of greater than 10:1. The encapsulated fibers are plasma-sprayed onto the substrate, as indicated at block 18. The plasma spraying may be air or suspension plasma spraying. The embedded fibers are substantially oriented within the plane of the coating due to the deposition process and provide increased toughness relative to through thickness cracking. Due to coating roughness and local variation in the deposition process, the fibers may vary in orientation in an amount of about plus and minus 30 degrees from the coating plane. This out of plane fiber orientation component contributes to increased toughness relative to planar cracking.

The plasma sprayed coating is formed by a buildup of molten ceramic particles that impact the substrate and form splats. The fracture toughness of the splat boundary is increased by incorporation of fibers during application of the coating to bridge the boundary. The fiber bridges the cracks or splat boundaries and shields them from further stresses through a process known as crack wake bridging. The result is a coating where the splats are more adherent and the coating itself has a higher fracture toughness. Erosion resistance also increases due to improved splat-to-splat adherence.

Fiber structure is maintained, and deposition efficiency achieved, by encapsulating the fibers in a relatively, to the fibers, low melting point material, then co-spraying them with the ceramic matrix material. Encapsulation is with a fugitive or precursor material, the composition and thickness of which influence the deposition and interfacial bonding with the ceramic matrix. Examples of precursors and fugitive binders that may be used individually or in mixtures include zirconium based materials, for example, zirconium sulfate, zirconium acetate, other zirconia salts, or organic polymers, such as PVA, acrylics, organo-metallic compounds and organic binders. The spray process is designed to melt or soften the encapsulation material while substantially leaving retaining the morphology and composition of the fibers.

The ceramic coating may be applied by APS in multiple layers, as indicated a block 20. At this point, the full toughening effect of the fibers may not be realized. The coating and precursor material is then heated to achieve the desired bonding between the fibers and matrix material of the coating. The ceramic coating may be heated during deposition of each layer or once all the ceramic matrix layers have been applied.

Depending on the cladding material and part surface temperature during spray, the decomposition of this layer will affect the adhesion of the next layer of the coating. One example process is that a coating of zirconia acetate is pyrolized and calcined once the fiber adheres to the part surface at approximately 700° C. (1290° F.). Upon return to the spray position with each passage under the torch, the previously deposited fibers become embedded within the coating. The conversion layer on the fibers is not sintered to full density, and can thereby be manipulated to provide the desired bond strength to the matrix coating.

This method may be used in conjunction with conventional powder feed APS or with suspension plasma spray (SPS). With SPS, this method may provide a means to produce fiber or whisker reinforced ceramic composites. The fine particle deposit of SPS may provide a matrix that can be sintered and densified while retaining the fiber reinforcement character. The result is a structure similar to SiC—SiC composites.

Figure 2:
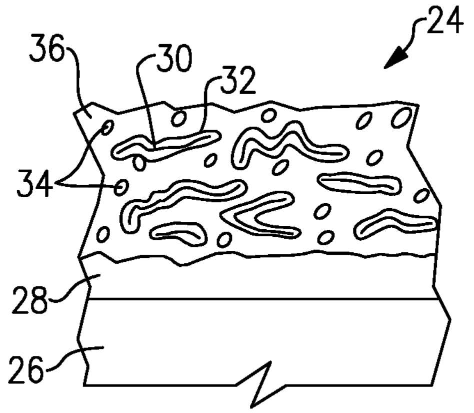
FIG. 2 depicts the thermally sprayed thermal barrier coating with encapsulated fibers.
Figure 3:
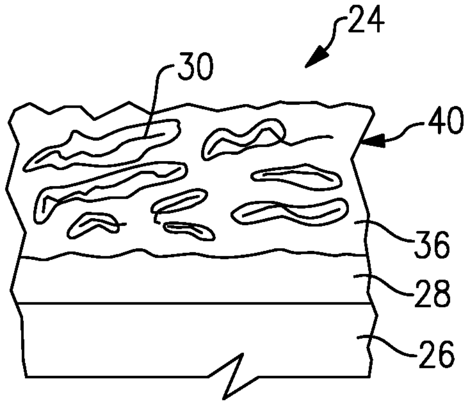
FIG. 3 depicts the thermally sprayed thermal barrier coating subsequent to heat treat.

FIG. 2 depicts a component prior to heat treat, and FIG. 3 depicts the component subsequent to heat treat. A bond coat 28 is adhered to a metallic substrate 26. The coating 36 with fibers 30 encapsulated in precursor material 32 is supported by the substrate 26, here, through the bond coat 28. The pre-heat treated coating may include voids. Once the ceramic matrix is heated, the size and/or number of voids is reduced and the fibers 30 are further interlinked to one another and the ceramic material 36, which increases toughness. The heat treat modifies the precursor and bonding between the fiber and matrix, not the matrix splats or particles. The relatively low temperature heat treatment does not substantially modify inter-splat bonding or cause much if any measurable shrinkage or densification.

Post-calcination includes, for example, a 50% dense fine particulate or web material within the space originally filled with precursor. A post-calcinated coating retains the porosity, micro-crack and splat boundary characteristics of the as-sprayed matrix.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing a fiber reinforced coating, the method comprising:

providing a substrate;

encapsulating fibers in a precursor material;

co-spraying the encapsulated fibers and a ceramic matrix material onto the substrate using plasma spraying, the ceramic matrix material made of a different material than the precursor material; and heat treating the encapsulated fibers and the ceramic matrix material after the co-spraying step, the heat treating step comprises at least one of pyrolyzing the precursor material or calcinating the precursor material at approximately 700° C. (1290° F.), and the heat treating step reduces at least a number or size of voids in the ceramic matrix material.

2. The method according to claim 1, wherein the substrate is a metallic substrate.

3. The method according to claim 2, wherein the metallic substrate is a nickel superalloy.

4. The method according to claim 1, wherein the plasma spraying is air plasma spraying.

5. The method according to claim 1, wherein the plasma spraying is suspension plasma spraying.

6. The method according to claim 1, comprising the step of applying a bond coating onto the substrate prior to the co-spraying step, the co-spraying step includes adhering the encapsulated fibers and the ceramic matrix material to the bond coat.

7. The method according to claim 1, wherein the precursor material contains zirconium.

8. The method according to claim 7, wherein the precursor material is at least one of zirconium sulfate, zirconium acetate and zirconia salts.

9. The method according to claim 1, wherein the precursor material is an organic polymer.

10. The method according to claim 9, wherein the precursor material is at least one of polyvinyl acetate, acrylic, an organo-metallic material and an organic binder.

11. The method according to claim 1, comprising the step of co-spraying additional encapsulated fibers and ceramic matrix material onto a prior layer of encapsulated fibers and ceramic matrix material.

12. The method according to claim 11, comprising the step of heat treating the coating prior to the additional encapsulated fibers and ceramic matrix material co-spraying step.

13. The method according to claim 11, comprising the step of heat treating the coating subsequent to the additional encapsulated fibers and ceramic matrix material co-spraying step.

14. The method according to claim 1, wherein the co-sprayed encapsulated fibers and ceramic matrix material provides a thermal barrier coating, and comprising the step of heat treating the thermal barrier coating to provide a ceramic matrix composite.

15. The method according to claim 14, wherein the heat treating step includes pyrolyzing the precursor material.

16. The method according to claim 14, wherein the heat treating step includes calcinating the precursor material.

17. The method according to claim 14, wherein the heat treating step includes reducing at least a number or size of voids in the thermal barrier coating.

18. The method according to claim 1, wherein the encapsulated fibers have an aspect ratio of greater than 10:1.

19. The method according to claim 18, wherein the encapsulated fibers are ceramic.

20. The method according to claim 18, wherein the encapsulated fibers are carbon.

* * * * *